(12) United States Patent
Seifert et al.

(10) Patent No.: US 10,137,743 B2
(45) Date of Patent: Nov. 27, 2018

(54) METHOD AND DEVICE FOR OPERATING A TIRE PRESSURE MONITORING DEVICE

(71) Applicant: Huf Hülsbeck & Fürst GmbH & Co. KG, Velbert (DE)

(72) Inventors: Andre Seifert, Pforzheim (DE); Benjamin Mueller, Bad Friedrichshall (DE); Markus Wagner, Ludwigsburg (DE); Karsten Sandrock, Bretten (DE); Peter Brand, Kieselbronn (DE)

(73) Assignee: HUF HÜLSBECK & FÜRST GMBH & CO. KG, Velbert (DE)

( * ) Notice: Subject to any disclaimer, the term of this patent is extended or adjusted under 35 U.S.C. 154(b) by 234 days.

(21) Appl. No.: 15/183,634

(22) Filed: Jun. 15, 2016

(65) Prior Publication Data

US 2016/0288593 A1    Oct. 6, 2016

Related U.S. Application Data

(63) Continuation of application No. PCT/EP2014/077914, filed on Dec. 16, 2014.

(51) Int. Cl.
*B60C 23/04* (2006.01)

(52) U.S. Cl.
CPC ...... *B60C 23/0413* (2013.01); *B60C 23/0411* (2013.01); *B60C 23/0455* (2013.01)

(58) Field of Classification Search
None
See application file for complete search history.

(56) References Cited

U.S. PATENT DOCUMENTS

| 3,329,934 A * | 7/1967 | Wooden | B60C 23/0433 |
| | | | 200/61.25 |
| 5,473,938 A * | 12/1995 | Handfield | B60C 23/0401 |
| | | | 340/445 |
| 6,175,302 B1 * | 1/2001 | Huang | B60C 23/0411 |
| | | | 340/442 |

(Continued)

FOREIGN PATENT DOCUMENTS

| DE | 10 2004 026 035 A1 | 12/2005 |
| EP | 1 623 849 A2 | 2/2006 |
| WO | 2013 153088 A1 | 10/2013 |

*Primary Examiner* — Jill E Culler
(74) *Attorney, Agent, or Firm* — Hackler Daghighian Martino & Novak

(57) ABSTRACT

A tire pressure monitoring device is mounted on a wheel of a vehicle provided with a pneumatic tire. The device contains a tire pressure sensor and a transmitter which transmits signals wirelessly in transmission intervals, between which in each case there is a first transmission pause. A control device controls the sensor, the transmitter and the first transmission pause thereof. A source provides electrical energy to a rechargeable electric accumulator, in which electrical energy delivered from the source is stored until it is required. The state of charge of the rechargeable electric accumulator is monitored by a monitoring device and one or more of the first transmission causes is/are then ended as soon as enough electrical energy is stored in the rechargeable accumulator to operate the tire pressure monitoring device between two successive first transmission pauses until the conclusion of a predetermined number of transmission processes.

17 Claims, 2 Drawing Sheets

(56) References Cited

U.S. PATENT DOCUMENTS

| | | | |
|---|---|---|---|
| 2004/0055370 A1* | 3/2004 | Normann | B60C 23/009 73/146 |
| 2004/0090322 A1* | 5/2004 | Tsujita | B60C 23/0416 340/442 |
| 2004/0206168 A1* | 10/2004 | Katou | B60C 23/0408 73/146 |
| 2005/0253697 A1 | 11/2005 | Taguchi | |
| 2015/0020585 A1* | 1/2015 | Dussinger | B60C 23/0411 73/146.5 |

* cited by examiner

METHOD AND DEVICE FOR OPERATING A TIRE PRESSURE MONITORING DEVICE

CROSS-REFERENCE TO RELATED APPLICATIONS

This continuation application claims priority to PCT/EP2014/077914 filed on Dec. 16, 2014 which was published as WO 2015/091450 A1 and also the German application number 10 2013 114 726.7 filed on Dec. 20, 2013, the contents of which are fully incorporated herein with these references.

DESCRIPTION

Field of the Invention

The present invention generally relates to monitoring the air pressure inside a pneumatic tire. More particularly, the present invention relates to a tire module inside a pneumatic tire for transmitting radio signals containing information regarding the tire pressure.

Background of the Invention

The invention proceeds from a method having the features specified in the claims. A method of this type is known from DE 10 2004 026 035 B4. This patent discloses a tire pressure monitoring system having devices mounted on the wheels of a vehicle for monitoring the tire pressure, which devices do not have a battery as electric power source, but instead a mechanical-electric converter. The mechanical-electric converter is controlled such that, in key operating phases in which frequent measurement and transmission processes are required, there is an amount of electrical energy stored in a rechargeable accumulator sufficient for the measurement and transmission processes. In operating phases that are of less importance, for example in the case of travel at slow speed, the accumulator can be recharged again by the mechanical-electrical converter. The supply of the tire pressure monitoring device with the electrical energy necessary for operation thereof is controlled by a central control unit mounted on the vehicle, which control unit is in radio connection with the tire pressure monitoring devices mounted on the wheels of the vehicle. The central control unit constantly receives information from the individual tire pressure monitoring devices via the radio link regarding the state of charge of the accumulator present in the tire pressure monitoring devices and determines on the basis of this information when each of the tire pressure monitoring devices can next measure the tire pressure and can transmit this measurement to the central control device. The energy required to maintain the control of the energy supply of each of the tire pressure monitoring devices is likewise generated and stored by the mechanical-electric converter provided in the tire pressure monitoring device.

It may be one of many objects of the present invention in contrast to reduce the outlay for the energy supply of the tire pressure monitoring device.

This object may be achieved by a method having the features specified in the method claims and by a device having the features specified in the apparatus claims. Further embodiments of the invention are disclosed in the dependent claims.

SUMMARY OF THE INVENTION

The method according to the invention is used to operate a tire pressure monitoring device which is mounted on a wheel of a vehicle provided with a pneumatic tire and which device contains a sensor, which delivers an electric output signal dependent on the tire pressure, a transmitter, which transmits signals wirelessly in transmission intervals, between which in each case there is a first transmission pause, said signals containing information dependent on the output signal of the sensor, a control device, which controls the sensor, the transmitter and the first transmission pause thereof, a source, which provides electrical energy for the operation of the tire pressure monitoring device, and a rechargeable electric accumulator, in which electrical energy delivered from the source is stored until it is required for the operation of the tire pressure monitoring device. In accordance with the invention the state of charge of the accumulator is monitored by a monitoring device provided in the tire pressure monitoring device and one or more of the first transmission pauses is/are then ended as soon as enough electrical energy is stored in the accumulator to operate the tire pressure monitoring device between two successive first transmission pauses until the conclusion of a predetermined number of transmission processes.

The invention may have (but which are not necessary) significant advantages:
  The state of charge of the rechargeable accumulator is monitored and controlled exclusively in the tire pressure monitoring device. The tire pressure monitoring device can operate autonomously in this respect and is not reliant on external control via a radio link.
  The avoidance of external control via a radio link makes the control of the state of charge of the accumulator in the tire pressure monitoring device less susceptible to faults.
  The energy that is required in the prior art for an external control is eliminated with application of the method according to the invention. This leads to the further advantage that less electrical energy has to be generated and stored in the tire pressure monitoring device.
  Since less energy has to be stored compared with the prior art, the rechargeable accumulator provided for this purpose can be smaller than in the prior art. This saves costs and weight.
  Because the weight of the tire pressure monitoring device can be saved with the method according to the invention, the imbalance caused at the wheel by the tire pressure monitoring device can be reduced.
  Since it is no longer necessary to produce so much energy in the tire pressure monitoring device compared with the prior art, the time required following a measurement and transmission process of the tire pressure monitoring device in order to recharge the accumulator is reduced. This makes it possible to shorten the transmission pauses between the measurement and transmission processes of the tire pressure monitoring device, which results in an increase in driving safety.

Each first transmission pause can in particular be ended as soon as there is enough electrical energy stored in the rechargeable accumulator to be able to operate the tire pressure monitoring device until the conclusion of a predetermined number of transmission processes. This results in particularly short first transmission pauses and in an accordingly concentrated monitoring.

The predetermined number of the transmission processes performed between two first transmission pauses for which sufficient electrical energy has been stored in the previous first transmission pause is selected to be at most two transmission processes, i.e. a complete measurement and transmission process is followed at most by one further measurement and transmission process, before the next first transmission pause is implemented. The amount of energy to be stored and the length of the first transmission pause can thus be minimized. A transmission process is understood to mean the wireless transmission of a data sequence, which preferably has a predetermined structure. A data sequence of this type is also referred to as a telegram. It can contain binary coded data between a preamble at the start of the telegram and a postamble at the end of the telegram, said data being constituted for example by the measured tire pressure, a pressure drop determined therefrom, the temperature measured in the tire pressure monitoring device, and an individual identification of the tire pressure monitoring device, on the basis of which a receiver provided in the vehicle can identify the origin of the telegram. The telegram can also contain further data, for example the current rotational speed and rotational direction of the wheel, which can be determined for example using an acceleration sensor provided in the tire pressure monitoring device, and/or tire specifications.

When a plurality of transmission processes are provided between two first transmission pauses and a plurality of data telegrams are transmitted accordingly, these telegrams can then directly adjoin one another, but can also be separated from one another by second transmission pauses, which expediently are small compared with the first transmission pauses and are particularly selected so that it is still possible to reliably identify where one data telegram ends and the next data telegram starts. This requires a few milliseconds.

The first transmission pauses can in particular be ended before the energy stored in the rechargeable accumulator reaches a value that is sufficient for two transmission processes and that is greater than the energy required for one measurement and transmission process. It is thus ensured that at the end of each first transmission pause enough energy certainly sufficient for one measurement and transmission process is stored in any case. If, in addition, the next first transmission pause starts already at the end of the first transmission process, this enables a particularly dense sequence of measurement and transmission processes with a particularly low amount of energy to be stored.

The voltage of the rechargeable accumulator can in particular be monitored, and the charging process is interrupted when, and for as long as, the voltage of the rechargeable accumulator lies above a predefined limit value. This limit value is a measure for the energy necessary for reliable operation of the tire pressure monitoring device between two successive first transmission pauses.

In the tire pressure monitoring device the output signal of the sensor can in particular be monitored in order to ascertain whether the measured tire pressure drops below a predefined limit value or whether the speed at which the measured tire pressure changes exceeds a predefined limit value. This monitoring can be performed in the tire pressure monitoring device also in first transmission pauses; it requires much less electrical energy than a transmission process. If the monitoring determines that the measured tire pressure has dropped below a predefined limit value or that the speed at which the tire pressure changes has exceeded a predefined limit value, the current first transmission pause is then in this case expediently ended prematurely and a corresponding warning signal is radioed to a central control device of the vehicle.

Particularly, a capacitor is used as rechargeable accumulator. It has been found that a relatively small capacitor is sufficient, for example a capacitor having a capacitance of 100 μF.

Particularly, a generator is used in the tire pressure monitoring device for the recharging of the accumulator, which generator generates electrical energy from the rolling movement of the wheel, said generator in particular being a generator which uses the piezoelectric effect in order to recover electrical energy. A generator of this type can generate a certain amount of electrical charge with each revolution of the wheel and can store said charge in the accumulator. It follows that the accumulator, for example a capacitor, is charged all the more quickly, the quicker the wheel turns or the faster the vehicle travels. It is therefore advantageous to develop the method according to the invention such that the first pause time is reduced with increasing rotational speed of the wheel. This advantageously results in the fact that the monitoring of the tire pressure can become better and better with increasing speed of the vehicle or with increasing rotational speed of the wheel. This is advantageous because the risk potential resulting from a pressure drop in the tire increases with the speed of the vehicle. For this reason it may be advantageous to then also reduce the first pause time with increasing rotational speed of the wheel when the generator delivering the electrical energy to be stored provides its energy independently of the rotational speed of the wheel. This is then for example the case when a radio receiver is provided in the tire pressure monitoring device, the electrical energy to be stored being transmitted to said radio receiver from outside the tire pressure monitoring device by means of a transmitter also carried in the vehicle. This can be implemented for example by radio signals having a much lower frequency, for example 125 kHz, than the radio signals emitted by the tire pressure monitoring device and having frequencies in the region of several hundred megahertz.

BRIEF DESCRIPTION OF THE DRAWINGS

The invention will be explained in greater detail on the basis of the accompanying drawings, with reference to which an exemplary embodiment is described.

DETAILED DESCRIPTION OF THE PREFERRED EMBODIMENTS

Figure 1:
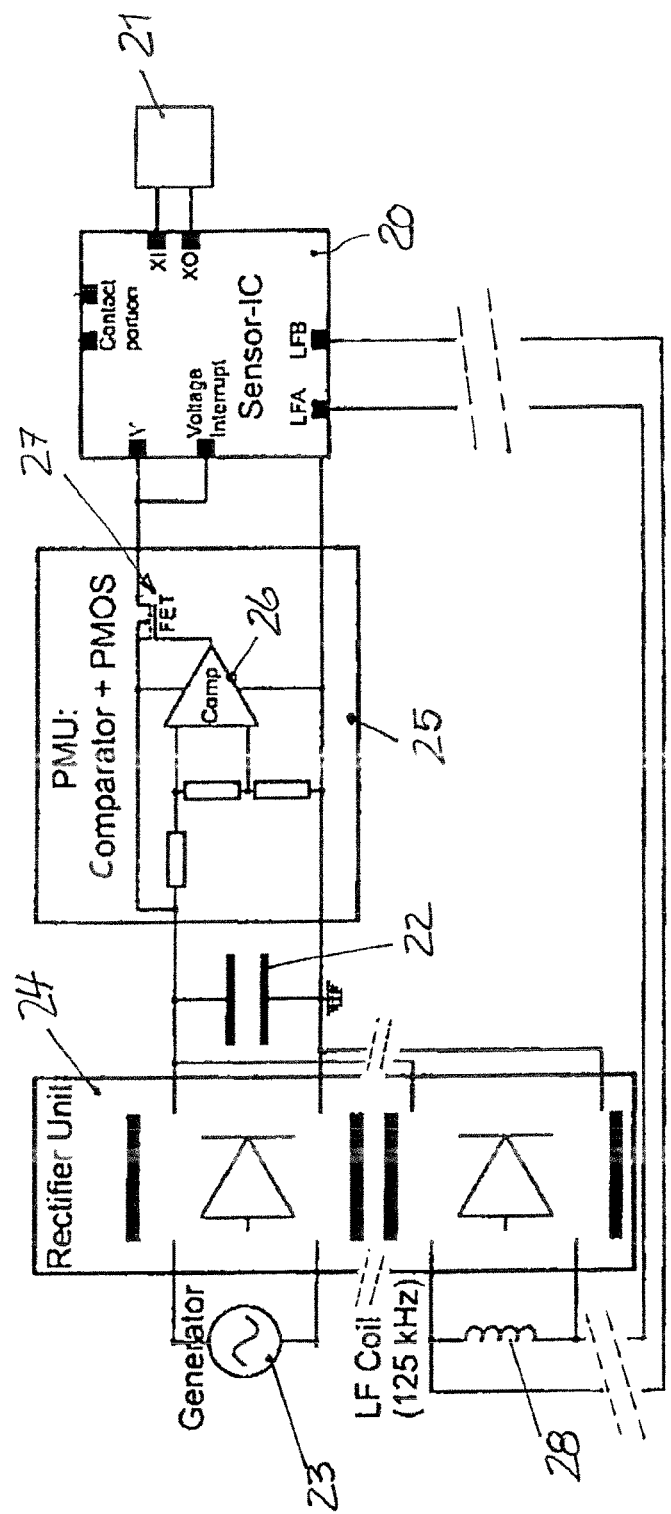
FIG. 1 is a block diagram of a circuit arrangement for carrying out the method according to the invention.
Figure 2:
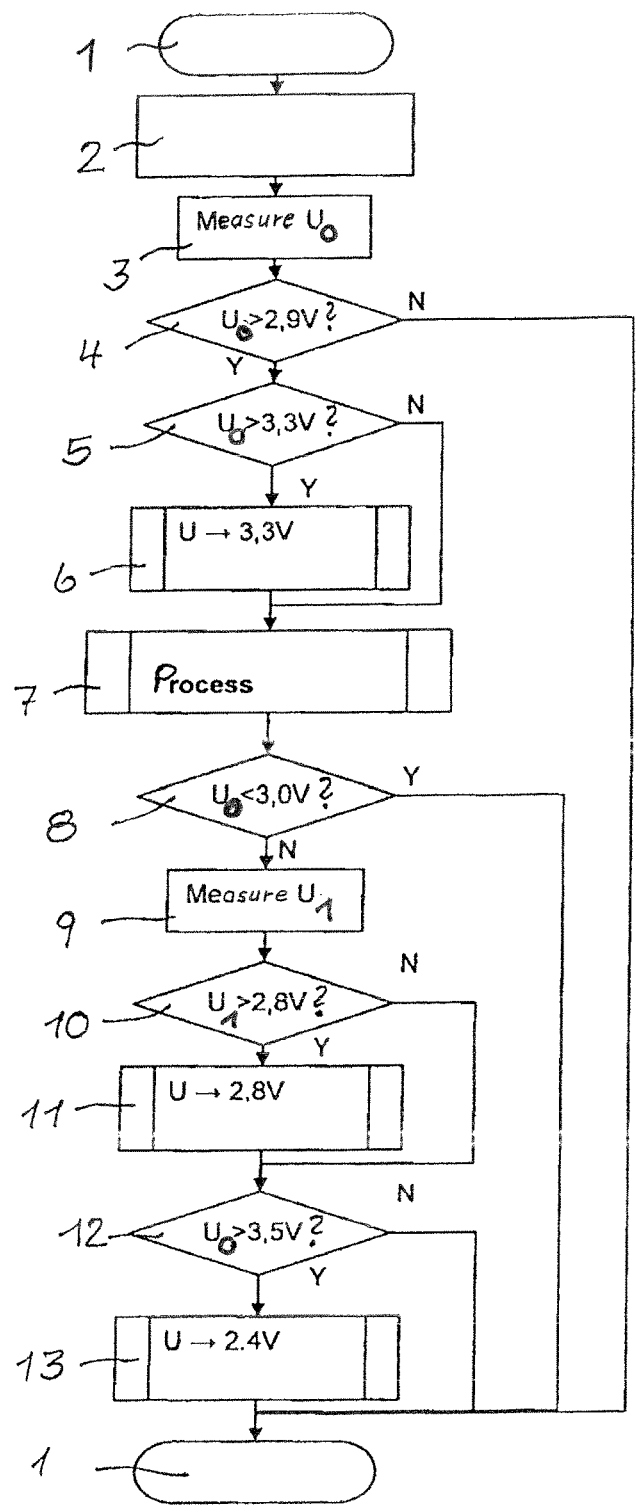
FIG. 2 is a flow diagram for an exemplary embodiment of the method according to the invention.

The circuit arrangement illustrated in FIG. 1 shows an integrated circuit 20 as the core of a tire pressure monitoring device secured to the wheel of a vehicle. The integrated circuit 20 contains at least one pressure sensor, which can measure the tire pressure, and determines the content of data telegrams, which a transmitter of the tire pressure monitoring device connected to the integrated circuit 20 radios to a receiver provided in the vehicle. An oscillator 21 delivers the clock frequency for the integrated circuit 20. The integrated circuit 20 can be an ASIC, that is to say an application-specific circuit, a microprocessor or a microcontroller.

A rechargeable accumulator is provided for the power supply of the integrated circuit 20, which rechargeable accumulator in the illustrated example is a capacitor 22. The capacitor 22 is charged by a generator 23 provided in the tire pressure monitoring device, which generator is preferably a piezoelectric generator, which generates a piezoelectric voltage from the rolling movement of the wheel on which the tire pressure monitoring device is mounted. The piezoelectric generator 23 can contain for example a piezo disc, which is connected to a movably mounted body of mass, which acts on the piezo disc with alternating centrifugal forces as the wheel rolls, said piezo disc then responding with a piezoelectrically generated alternating voltage. A piezoelectric generator of this type is disclosed for example in EP 1 549 514 B1. The piezoelectrically generated alternating voltage signal is rectified by means of a rectifier 24. The capacitor 22 is charged with the rectified voltage.

The voltage of the capacitor 22 is regulated by a power management unit 25, which has a comparator 26 and a field effect transistor 27, in particular a PEMOS FET, as main component parts. The capacitor 22 supplies power to the integrated circuit 20 via the power management unit 25 in the phases in which measurement and transmission processes are to take place. These phases are started and ended by the switching processes of the field effect transistor 27.

The integrated circuit 20 can be connected optionally to a receiver coil 28, which can receive low-frequency signals, in particular signals having a frequency of 125 kHz, which are transmitted wirelessly from outside the tire pressure monitoring device. Control signals and/or data can be transmitted to the integrated circuit 20 via this receiver coil 28. Instead of the generator 23 or in addition to the generator 23 a receiver coil 28 of this type can also be used to receive signals, which likewise can be used to charge the capacitor 22 after rectification.

In order to make it clear that this is just one possible option, the connection lines from the receiver coil 28 to the capacitor 22 and to the integrated circuit 20 are illustrated in an interrupted manner.

An example of a method according to the invention which can be carried out with a circuit arrangement of the type illustrated in FIG. 1 will be described hereinafter.

The method starts with an activation of the tire pressure monitoring device in step 1. The tire pressure monitoring device then passes with step 2 into a charging phase, in which a rechargeable accumulator formed as a capacitor is to be recharged, for example the capacitor 22 of the circuit arrangement from FIG. 1. The charging phase lasts for a predefined period of time. It should not be so long that the capacitor 22 reaches or exceeds an upper limit value of the voltage, which could lead to overload of the downstream circuit, in particular of the integrated circuit 20 from FIG. 1, which is supplied with power by the capacitor 22. It has been found that a duration of one second is favourable for the charging phase. The charging phase should not last longer than 1.5 seconds in the case of a circuit as is illustrated in FIG. 1.

The charging phase ends with the start of the process 7, in which a measurement and transmission process takes place in the tire pressure monitoring device. In order to arrive at this point, the voltage $U_0$ of the capacitor 22 is first measured following the start of the charging phase in a first control loop in the following step 3 and is compared in step 4 to a first threshold value, for which 2.9 V is a realistic value. If the voltage $U_0$ of the capacitor 22 does not lie above the first threshold value, the method jumps back to step 1, in order to further increase the voltage of the capacitor 22, possibly following a short interruption. If, however, the comparison performed in step 4 reveals that the voltage $U_0$ of the capacitor 22 lies above the first threshold value of for example 2.9 V, the voltage of the capacitor 22 is then compared in the next step 5 to an upper limit value of for example 3.3 V, which is selected such that it lies slightly below the voltage at which the circuit downstream of the capacitor 22 would be overloaded. In the circuit illustrated in FIG. 1, this is the integrated circuit 20, of which the load-bearing capacity determines the maximum permissible voltage of the capacitor 22. If the comparison carried out in step 5 reveals that the voltage $U_0$ of the capacitor 22 exceeds the predefined upper limit value of for example 3.3 V, the voltage of the capacitor 22 is then lowered in the sixth step to the upper limit value of for example 3.3 V, and the process 7 can be started, in which a measurement and transmission process takes place. If, however, the comparison carried out in step 5 reveals that the voltage $U_0$ of the capacitor 22 does not lie above the upper limit value of for example 3.3 V, the method can be continued to the process 7 with a bypass of step 6. As the process 7 is performed, the charging phase is interrupted, since the energy consumption is greater than the charging circuit can deliver.

With conclusion of the process 7, the next charging phase starts and in a second control loop it is checked in step 8 whether the voltage $U_0$ of the capacitor 22 then drops below a second threshold value. A realistic value for the second threshold value is 3 V. If the comparison carried out in step 8 has the result that the voltage $U_0$ of the capacitor 22 lies below the second threshold value of for example 3 V, the method jumps back to step 1. If, however, the comparison carried out in step 8 has the result that the voltage $U_0$ of the capacitor 22 does not lie below the second threshold value of for example 3 V, the actual voltage $U_1$ of the capacitor 22 is then measured in step 9 in order to determine in step 10 whether it is greater than a third threshold value, which lies below the second threshold value of for example 3 V and for example is 2.8 V. If the actual voltage $U_1$ of the capacitor 22 lies above the third threshold value of for example 2.8 V, it is reduced in step 11 to the third threshold value of for example 2.8 V. In step 12, since the charging process is continued, it is checked whether the voltage $U_0$ of the capacitor 22 has then exceeded the upper limit value of for example 3.3 V. If, however, the comparison carried out in step 10 has the result that the actual voltage of the capacitor 22 does not lie above 2.8 V, the method is continued with step 12, with a bypass of step 11, the voltage $U_0$ of the capacitor 22 being compared in step 12 with its upper limit value of for example 3.5 V. If the upper limit value of the voltage $U_0$ of the capacitor 22 of for example 3.5 V has been exceeded, the voltage of the capacitor 22 is reduced in step 13 to a lower limit value, for which a realistic value is 2.4 V and which expediently is no lower than 2 V. The method then jumps back to step 1. If, however, the comparison in step 12 reveals that the voltage of the capacitor 22 does not lie above its upper limit value of for example 3.5 V, the method then jumps back to step 1 from step 12, with a bypass of step 13. The limit value in step 12 need not be 3.5 V. It is important that the tire pressure monitoring device is protected against damage resulting from an excessively high voltage. The limit value in step 12 can also lie below 3.5 V, for example can be 3.3 V.

The control loop for the voltage $U_0$ directly following the activation of the tire pressure monitoring device and the control loop for the voltage $U_1$ following the execution of the process 7 can ensure protection of the tire pressure monitoring device against overvoltage. As a result of the selection of the limit values of the voltage, no unnecessary voltage measurements have to be taken for the overvoltage protection, which is favourable for economical energy consumption. The state of charge of the capacitor 22 is held by the voltage regulation between two limit values selected such that the energy stored in the capacitor 22 is sufficient for at least one measurement and transmission process of the tire pressure monitoring device.

LIST OF REFERENCE SIGNS 1 to 13 steps
20 integrated circuit
21 oscillator
22 capacitor
23 generator
24 rectifier
25 power management unit
26 comparator
27 field effect transistor
28 receiver coil
U voltage

What is claimed is:

1. A method for operating a tire pressure monitoring device which is mounted on a wheel of a vehicle provided with a pneumatic tire, the method comprising the steps of:
   providing the tire pressure monitoring device comprising:
      a sensor, which delivers an electric output signal dependent on a tire pressure;
      a transmitter, which transmits signals wirelessly in transmission intervals, between which in each case there is a first transmission pause, said signals containing information dependent on the output signal of the sensor;
      a control device, which controls the sensor, the transmitter and the first transmission pause thereof;
      a source, which provides electrical energy for the operation of the tire pressure monitoring device, wherein the electrical energy to be stored is generated in the tire pressure monitoring device using a generator as the source, the generator generating the electrical energy from the rolling movement of the wheel; and
      a rechargeable electric accumulator, in which electrical energy delivered from the source is stored until it is required for the operation of the tire pressure monitoring device;
   monitoring the state of charge of the rechargeable electric accumulator by a monitoring device provided in the tire pressure monitoring device; and
   ending one or more of the first transmission pauses as soon as enough electrical energy is stored in the rechargeable electric accumulator to operate the tire pressure monitoring device between two successive first transmission pauses until the conclusion of a predetermined number of transmission processes, wherein the predetermined number of transmission process is greater than one.

2. The method according to claim 1, wherein each first transmission pause is ended as soon as enough electrical energy is stored in the rechargeable electric accumulator to operate the tire pressure monitoring device until the conclusion of a predetermined number of measurement and transmission processes.

3. The method according to claim 1, wherein the predetermined number of measurement and transmission processes taking place between two first transmission pauses for which electrical energy has been stored in the previous first transmission pause is selected to be at most two.

4. The method according to claim 1, wherein between two successive first transmission pauses, the transmission processes take place uninterruptedly or at most with second transmission pauses, which are smaller compared with the first transmission pauses.

5. The method according to claim 1, wherein at least one or more of the first transmission pauses is/are ended before the energy stored in the rechargeable accumulator reaches a value sufficient for two measurement and transmission processes, and in that the next first transmission pause starts already at the end of the first transmission process.

6. The method according to claim 1, wherein the voltage of the rechargeable electric accumulator is monitored, and in that the charging process is interrupted when, and for as long as, the voltage of the rechargeable electric accumulator lies above a predefined limit value.

7. The method according to claim 1, wherein the output signal of the sensor is monitored in the tire pressure monitoring device in order to ascertain whether the measured tire pressure drops below a predefined limit value, and in that in this case a current first transmission pause is ended prematurely.

8. The method according to claim 1, wherein the output signal of the sensor is monitored in the tire pressure monitoring device in order to ascertain whether the speed at which the measured tire pressure changes exceeds a predefined limit value, and in that in this case a current first transmission pause is ended prematurely.

9. The method according to claim 1, wherein a capacitor is used as the rechargeable electric accumulator.

10. The method according to claim 1, wherein the generator uses the piezoelectric effect in order to recover the electrical energy.

11. The method according to claim 1, wherein the electrical energy to be stored is transmitted from a transmitter carried in the vehicle outside the tire pressure monitoring device to a radio receiver provided in the tire pressure monitoring device, which radio receiver conducts said energy into the rechargeable electrical accumulator.

12. The method according to claim 1, wherein the first pause time is reduced with increasing rotational speed of the wheel.

13. The method according to claim 1, wherein a measurement and transmission process is started when the state of charge of the rechargeable electrical accumulator, in particular the voltage thereof, lies between an upper limit value and a lower limit value, which are selected such that at least one and at most two measurement and transmission processes can be carried out.

14. A tire pressure monitoring device mounted on a wheel of a vehicle provided with a pneumatic tire, the tire pressure monitoring device comprising:
   a sensor, which delivers an electric output signal dependent on a tire pressure;
   a transmitter, which transmits signals wirelessly in transmission intervals, between which in each case there is a first transmission pause, said signals containing information dependent on the electric output signal of the sensor;
   a control device, which controls the sensor, the transmitter and the first transmission pause thereof;
   a source, which provides electrical energy for the operation of the tire pressure monitoring device, wherein the electrical energy to be stored is generated in the tire pressure monitoring device using a generator as the source, the generator generating the electrical energy from the rolling movement of the wheel;

a rechargeable electric accumulator, in which the electrical energy delivered from the source is stored until it is required for the operation of the tire pressure monitoring device; and a monitoring device is provided in the tire pressure monitoring device in order to monitor the state of charge of the rechargeable electric accumulator, by which monitoring device one or more of the first transmission pauses can be then ended as soon as enough electrical energy is stored in the rechargeable electric accumulator to operate the tire pressure monitoring device between two successive first transmission pauses until the conclusion of a predetermined number of transmission processes, wherein the predetermined number of transmission process is greater than one.

15. The device according to claim 14, wherein a capacitor is provided as rechargeable electric accumulator.

16. The device according to claim 14, wherein the generator recovers the electrical energy with use of the piezoelectric effect from the rolling movement of a wheel on which the tire pressure monitoring device is mounted, and in that the generator is arranged in an autonomously working manner in the tire pressure monitoring device.

17. The device according to claim 14, wherein the tire pressure monitoring device contains an integrated circuit, which brings about the measurement processes and is controlled in turn by the monitoring device.

* * * * *